(12) United States Patent
Caswell et al.

(10) Patent No.: US 12,448,883 B2
(45) Date of Patent: *Oct. 21, 2025

(54) SONDE WITH ADVANCED BATTERY POWER CONSERVATION AND ASSOCIATED METHODS

(71) Applicant: Merlin Technology, Inc., Kent, WA (US)

(72) Inventors: Craig A. Caswell, Mattawa, WA (US); Scott D. Phillips, Normandy Park, WA (US)

(73) Assignee: Merlin Technology, Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,817

(22) Filed: Apr. 23, 2024

(65) Prior Publication Data

US 2024/0271523 A1    Aug. 15, 2024

Related U.S. Application Data

(63) Continuation of application No. 17/843,838, filed on Jun. 17, 2022, now Pat. No. 11,994,023.

(51) Int. Cl.
*E21B 47/13*     (2012.01)
*E21B 7/04*      (2006.01)
(Continued)

(52) U.S. Cl.
CPC .............. *E21B 47/13* (2020.05); *E21B 7/046* (2013.01); *E21B 47/0232* (2020.05); *E21B 47/024* (2013.01)

(58) Field of Classification Search
CPC .......... E21B 47/13; E21B 7/046; E21B 41/00; E21B 47/024; E21B 47/0232
See application file for complete search history.

(56) References Cited

U.S. PATENT DOCUMENTS

| | | |
|---|---|---|
| 3,597,680 A | 8/1971 | Haddon |
| 3,906,504 A | 9/1975 | Guster et al. |

(Continued)

FOREIGN PATENT DOCUMENTS

| | | |
|---|---|---|
| WO | 2007016687 A1 | 2/2007 |
| WO | 2007019319 A1 | 2/2007 |

OTHER PUBLICATIONS

U.S. Appl. No. 17/843,838, filed Jun. 17, 2022, Craig Caswell.

(Continued)

*Primary Examiner* — Brad Harcourt
(74) *Attorney, Agent, or Firm* — Pritzkau Patent Group LLC; Michael M Pritzkau

(57) ABSTRACT

A transmitter for an inground operation includes an antenna and a sensor section for generating sensor data. An antenna driver selectively drives the antenna to emit a locating signal such that the locating signal carries the sensor data. A processor controls the antenna driver to transmit the locating signal during a normal mode and to enter a sleep state that disables at least the sensor section and the antenna driver such that the locating signal is not transmitted responsive to detecting that the transmitter is inactive. The processor can enter a snooze mode from the normal mode by disabling the antenna driver so that the locating signal is not transmitted, without disabling the sensor section, and the snooze mode requires less power than the normal mode but more power than the sleep state.

11 Claims, 5 Drawing Sheets

(51) Int. Cl.
*E21B 47/0232* (2012.01)
*E21B 47/024* (2006.01)

(56) References Cited

U.S. PATENT DOCUMENTS

| | | | |
|---|---|---|---|
| 4,054,881 | A | 10/1977 | Raab |
| 4,314,251 | A | 2/1982 | Raab |
| 4,361,192 | A | 11/1982 | Trowsdale |
| 4,646,277 | A | 2/1987 | Bridges et al. |
| 5,065,098 | A | 11/1991 | Salsman et al. |
| 5,086,508 | A | 2/1992 | Furuno |
| 5,264,795 | A | 11/1993 | Rider |
| 5,337,002 | A | 8/1994 | Mercer |
| 5,564,101 | A | 10/1996 | Eisfeld et al. |
| 5,720,354 | A | 2/1998 | Stump et al. |
| 5,878,824 | A | 3/1999 | Mercer et al. |
| 6,002,258 | A | 12/1999 | Mercer |
| 6,005,532 | A | 12/1999 | Ng |
| 6,008,651 | A | 12/1999 | Mercer |
| 6,035,951 | A | 3/2000 | Mercer et al. |
| 6,079,506 | A | 6/2000 | Mercer |
| 6,223,826 | B1 | 5/2001 | Chau et al. |
| 6,285,190 | B1 | 9/2001 | Brune et al. |
| 6,360,820 | B1 | 3/2002 | Laborde et al. |
| 6,411,094 | B1 | 6/2002 | Gard et al. |
| 6,496,008 | B1 | 12/2002 | Brune et al. |
| 6,606,032 | B1 | 8/2003 | Fling |
| 6,727,704 | B2 | 4/2004 | Brune et al. |
| 6,737,867 | B2 | 5/2004 | Brune et al. |
| 6,756,783 | B2 | 6/2004 | Brune et al. |
| 6,776,246 | B1 | 8/2004 | Nickel et al. |
| 6,854,535 | B1 | 2/2005 | Mizuno |
| 6,980,123 | B2 | 12/2005 | Fling |
| 7,025,152 | B2 | 4/2006 | Sharp et al. |
| 7,150,331 | B2 | 12/2006 | Cole et al. |
| 7,201,236 | B1 | 4/2007 | Nickel et al. |
| 7,221,136 | B2 | 5/2007 | Olsson et al. |
| 7,251,567 | B2 | 7/2007 | Nickel et al. |
| 7,331,409 | B2 | 2/2008 | Cole et al. |
| 7,624,816 | B2 | 12/2009 | Cole et al. |
| 7,663,373 | B1 | 2/2010 | Gard et al. |
| 7,735,555 | B2 | 6/2010 | Patel et al. |
| 7,805,263 | B2 | 9/2010 | Mack |
| 8,056,619 | B2 | 11/2011 | Patel et al. |
| 8,220,564 | B2 | 7/2012 | Runquist et al. |
| 8,695,727 | B2 | 4/2014 | Chau et al. |
| 9,065,922 | B2 | 6/2015 | Khan |
| 9,081,098 | B2 | 7/2015 | Misonoo et al. |
| 9,265,560 | B2 | 2/2016 | Johnston |
| 9,425,619 | B2 | 8/2016 | Chau et al. |
| 9,448,199 | B2 | 9/2016 | Roh et al. |
| 9,685,599 | B2 | 6/2017 | Petrovski et al. |
| 9,798,033 | B2 | 10/2017 | Olsson et al. |
| 10,563,502 | B1 | 2/2020 | Phillips et al. |
| 11,867,057 | B2 | 1/2024 | Chau |
| 11,994,023 | B2* | 5/2024 | Caswell ............... E21B 7/046 |
| 2002/0057074 | A1 | 5/2002 | Aoyama et al. |
| 2002/0065062 | A1 | 5/2002 | Levesque |
| 2002/0105331 | A1 | 8/2002 | Brune et al. |
| 2002/0171560 | A1 | 11/2002 | Ciglenec et al. |
| 2003/0095608 | A1 | 5/2003 | Duperray |
| 2004/0189487 | A1 | 9/2004 | Hoefel et al. |
| 2005/0024233 | A1 | 2/2005 | Fling et al. |
| 2006/0012490 | A1 | 1/2006 | Fling |
| 2006/0122473 | A1 | 6/2006 | Kill et al. |
| 2006/0283632 | A1 | 12/2006 | Hall et al. |
| 2007/0149162 | A1 | 6/2007 | Greene et al. |
| 2008/0311961 | A1 | 12/2008 | Cotevino et al. |
| 2009/0245025 | A1 | 10/2009 | Rhodes et al. |
| 2009/0264789 | A1 | 10/2009 | Molnar et al. |
| 2010/0090530 | A1 | 4/2010 | Watanabe |
| 2010/0214082 | A1 | 8/2010 | Covaro et al. |
| 2010/0216521 | A1 | 8/2010 | Wu et al. |
| 2010/0253291 | A1 | 10/2010 | Lin |
| 2010/0270979 | A1 | 10/2010 | Bonkhoff et al. |
| 2011/0001633 | A1 | 1/2011 | Lam et al. |
| 2011/0170590 | A1 | 7/2011 | Ghabra et al. |
| 2011/0208456 | A1 | 8/2011 | Mickelsen |
| 2011/0316715 | A1 | 12/2011 | Kato et al. |
| 2012/0109552 | A1 | 5/2012 | Hancock et al. |
| 2012/0109553 | A1 | 5/2012 | Hancock et al. |
| 2012/0115488 | A1 | 5/2012 | Jiang et al. |
| 2012/0169270 | A1 | 7/2012 | Cho et al. |
| 2012/0206269 | A1 | 8/2012 | Wickman et al. |
| 2012/0211278 | A1 | 8/2012 | Gonzalez et al. |
| 2012/0217971 | A1 | 8/2012 | DeLuca |
| 2012/0218863 | A1 | 8/2012 | Chau et al. |
| 2012/0249323 | A1 | 10/2012 | McRae |
| 2012/0254633 | A1 | 10/2012 | Vilhauer et al. |
| 2012/0288019 | A1 | 11/2012 | Okamura et al. |
| 2012/0306655 | A1 | 12/2012 | Tan et al. |
| 2012/0323511 | A1 | 12/2012 | Saigo et al. |
| 2013/0017840 | A1 | 1/2013 | Moeglein et al. |
| 2013/0028300 | A1 | 1/2013 | Alberth et al. |
| 2013/0033233 | A1 | 2/2013 | Noda et al. |
| 2013/0093567 | A1 | 4/2013 | Garman et al. |
| 2013/0154635 | A1 | 6/2013 | Mandal et al. |
| 2013/0162402 | A1 | 6/2013 | Amann et al. |
| 2013/0176137 | A1 | 7/2013 | Hall et al. |
| 2013/0176139 | A1 | 7/2013 | Chau et al. |
| 2013/0200901 | A1 | 8/2013 | Olsson et al. |
| 2013/0272449 | A1 | 10/2013 | Lusted |
| 2013/0293018 | A1 | 11/2013 | Wu et al. |
| 2013/0342178 | A1 | 12/2013 | Wang |
| 2014/0055278 | A1 | 2/2014 | Chau et al. |
| 2014/0225622 | A1 | 8/2014 | Kudo et al. |
| 2014/0252866 | A1 | 9/2014 | Walsh et al. |
| 2014/0262513 | A1 | 9/2014 | Chau et al. |
| 2014/0265619 | A1 | 9/2014 | Chau et al. |
| 2014/0266018 | A1 | 9/2014 | Carobolante |
| 2014/0266770 | A1 | 9/2014 | Chau et al. |
| 2014/0273885 | A1 | 9/2014 | Chen |
| 2014/0286219 | A1 | 9/2014 | Siomina et al. |
| 2015/0070186 | A1 | 3/2015 | Gonzalez et al. |
| 2015/0072721 | A1 | 3/2015 | Lagnado |
| 2016/0069180 | A1 | 3/2016 | Zeller et al. |
| 2019/0003299 | A1 | 1/2019 | Zeller et al. |
| 2019/0162064 | A1 | 5/2019 | Donderici et al. |
| 2019/0211670 | A1 | 7/2019 | Chau et al. |
| 2020/0165905 | A1 | 5/2020 | Gooneratne et al. |
| 2020/0232317 | A1 | 7/2020 | Chau et al. |

OTHER PUBLICATIONS

Chapter II Demand Relating to the International Search Report and Written Opinion in PCT Application No. PCT/US2022/034336 which is related to U.S. Appl. No. 17/843,838, dated Apr. 21, 2023.
International Preliminary Report on Patentability in PCT Application No. PCT/US2022/034336 which is related to U.S. Appl. No. 17/843,838, dated Aug. 30, 2023.
International Search Report and Written Opinion in PCT Application No. PCT/US2022/034336 which is related to U.S. Appl. No. 17/843,838, dated Oct. 12, 2022.
Office Action in U.S. Appl. No. 17/843,838, dated Jun. 7, 2023, Alexandria, VA.
Prosecution History of U.S. Appl. No. 16/841,641 as of Dec. 28, 2023.
Raghavan, et al., Architectural Comparison of Analog and Digital Duty Cycle Corrector for High Speed I/O Link, 2010 23rd International Conference on VLSI Design, Jan. 2010.
International Preliminary Report on Patentability for International Application No. PCT/2014/030605 which is associated with U.S. Appl. No. 14/214,074, filed Sep. 16, 2015, Alexandria, VA.
Prosecution History for U.S. Appl. No. 16/841,641 as of Jun. 29, 2024.
Prosecution History of U.S. Appl. No. 14/214,074, filed Mar. 14, 2014, as of Mar. 7, 2019.
The International Search Report and The Written Opinion of the International Searching Authority for International Application No. PCT/2014/030605 which is associated with U.S. Appl. No. 14/214,074, filed Jul. 10, 2014, Moscow, Russia.

(56) References Cited

OTHER PUBLICATIONS

Written Opinion of the International Preliminary Examining Authority for International Application No. PCT/2014/030605 which is associated with U.S. Appl. No. 14/214,074, filed May 18, 2015, Alexandria, VA.

Extended European Search Report for European Application No. 17843838-1002 which is related to PCT Application No. PCT/US2022/034336 which is related to U.S. Appl. No. 17/843,838, dated Mar. 10, 2025.

* cited by examiner

SONDE WITH ADVANCED BATTERY POWER CONSERVATION AND ASSOCIATED METHODS

RELATED APPLICATIONS

The present application is a continuation application of copending U.S. patent application Ser. No. 17/843,838 filed on Jun. 17, 2022 and further claims priority from U.S. Provisional Patent Application No. 63/213,679, filed on Jun. 22, 2021, each bearing the same title as the present application and each of which is hereby incorporated by reference in its entirety.

BACKGROUND

The present application is at least generally related to the field of horizontal directional drilling and, more particularly, to an inground device or transmitter for use in horizontal directional drilling.

While not intended as being limiting, one example of an application which involves the use of an inground device or transmitter is Horizontal Directional Drilling (HDD). The latter can be used for purposes of installing a utility without the need to dig a trench. A typical utility installation involves the use of a drill rig having a drill string that supports a boring tool, serving as one embodiment of an inground tool, at a distal or inground end of the drill string. The drill rig forces the boring tool through the ground by applying a thrust force to the drill string. The boring tool is steered during the extension of the drill string to form a pilot bore. Upon completion of the pilot bore, the distal end of the drill string is attached to a pullback apparatus which is, in turn, attached to a leading end of the utility. The pullback apparatus and utility are then pulled through the pilot bore via retraction of the drill string to complete the installation. In some cases, the pullback apparatus can comprise a back reaming tool, serving as another embodiment of an inground tool, which expands the diameter of the pilot bore ahead of the utility so that the installed utility can be of a greater diameter than the original diameter of the pilot bore.

Locating systems are commonly used in HDD help ensure that the underground utility is installed along the desired path (including depth) underground. Walkover locating systems are the most common form of locating system, and typically include a battery-powered transmitter (or sonde) proximate to the boring tool which collects positional data underground and transmits wirelessly to the surface, with the signal being picked up by an above-ground receiver. Walkover locating systems provide convenience, but with that convenience comes trade-offs. For example, with particularly long underground drilling projects, the battery life of the transmitter can become a limiting factor. Wireline systems, whereby a wire extends from the transmitter back up the underground path to the drill rig, are sometimes used for projects requiring significant depth and/or involving significant interference or other challenges. Wireline systems do not present the same battery life limitation as walkover systems because the transmitter can be powered from an external source (for example, an above ground power source via the wire), but these systems present different trade-offs including being more burdensome, time-intensive and costly to operate than walkover locating systems.

Applicant recognizes that there is a need for improvement in battery power conservation in transmitters for walkover locating systems. As a non-limiting example, Applicant further recognizes that some particularly challenging underground drilling projects for which a wireline system might have traditionally been used for the entire project might be accomplished more efficiently by using a wireline system for the initial portion of the project and then completing the project with a walkover (wireless, battery-powered transmitter) system. Applicant recognizes that to help make such a solution possible, it would be helpful to conserve the battery life of the wireless transmitter while the underground drilling is ongoing until the wireline portion of the project is completed and the walkover system is needed. As another example of this need, some walkover locating projects include crossing rivers or freeways where locating may not be possible. Applicant recognizes that a system which allows for a battery-powered transmitter to be significantly inactive or not transmitting while underground drilling is occurring, such that the battery power of the transmitter may be conserved during portions of the underground drilling where walkover (or wireless) locating is not possible or desired, would enhance the flexibility and capability to perform such underground drilling projects.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, a transmitter for use in conjunction with a horizontal directional drilling system that includes a drill string that extends from a drill rig to an inground tool which supports the transmitter such that extension and retraction of the drill string moves the inground tool through the ground during an inground operation. In one aspect of the present disclosure, the transmitter includes an antenna and a sensor section at least including an orientation sensor for generating sensor data. An antenna driver is configured for selectively driving the antenna to emit a locating signal for aboveground reception such that the locating signal carries the sensor data. A processor controls the antenna driver to transmit the locating signal during a normal mode and to enter a sleep state that disables at least the sensor section and the antenna driver such that the locating signal is not transmitted responsive to detecting that the transmitter is inactive and the processor is further configured to enter a snooze mode from the normal mode by disabling the antenna driver so that the locating signal is not transmitted, without disabling the sensor section, and the snooze mode requires less power than the normal mode but more power than the sleep state.

BRIEF DESCRIPTIONS OF THE DRAWINGS

Example embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
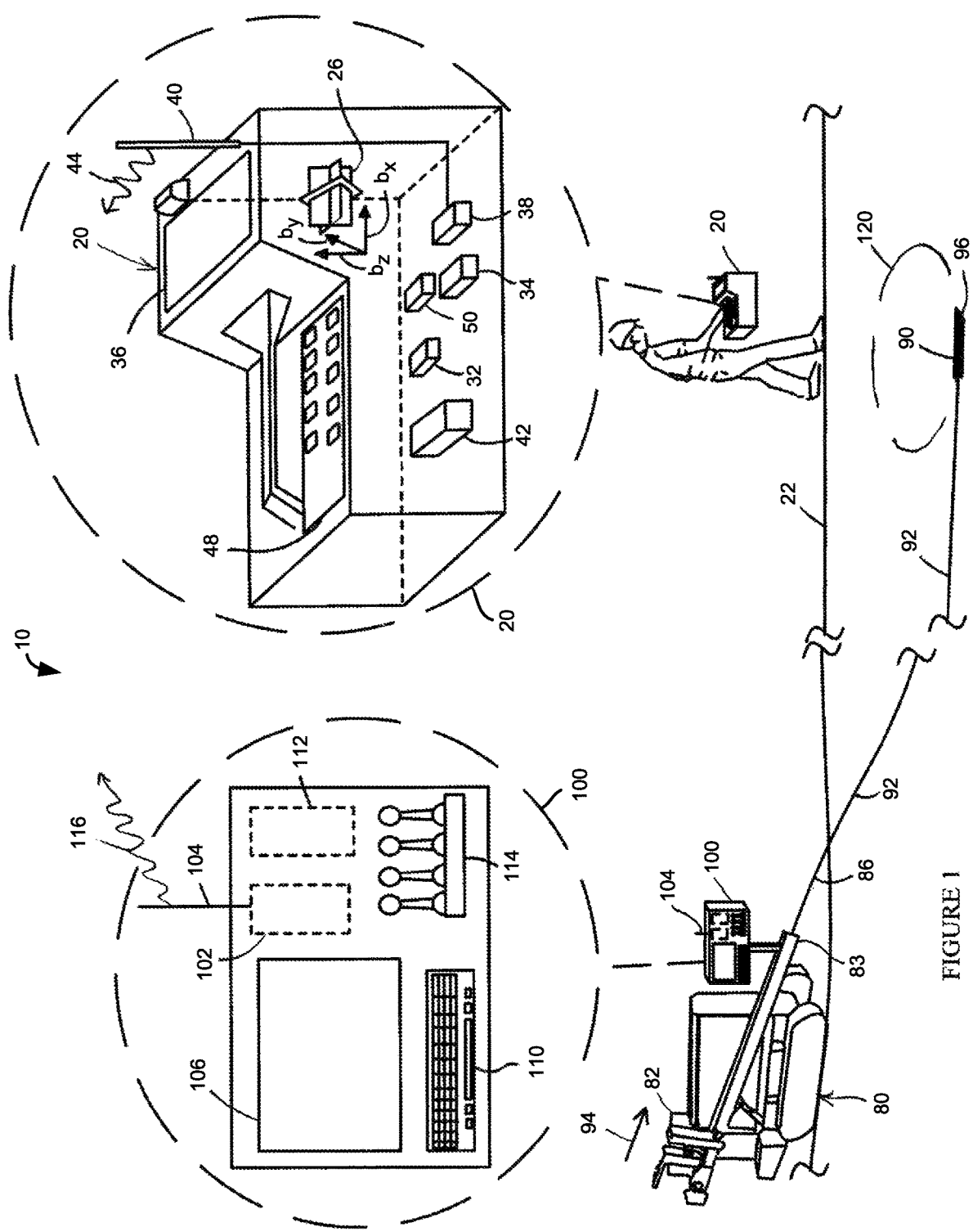
FIG. 1 is a diagrammatic view of an embodiment of a system for performing an inground operation in accordance with the present disclosure utilizing a battery powered sonde.

Turning now to the drawings, wherein like items may be indicated by like reference numbers throughout the various figures, attention is immediately directed to FIG. 1, which illustrates one embodiment of a system for performing an inground operation, generally indicated by the reference number 10. The system includes a portable device 20 that is shown being held by an operator above a surface 22 of the ground as well as in a further enlarged inset view. It is noted that inter-component cabling within device 20 has not been illustrated in order to maintain illustrative clarity, but is understood to be present and may readily be implemented by one having ordinary skill in the art in view of this overall disclosure. Device 20 includes a three-axis antenna cluster 26 measuring three orthogonally arranged components of magnetic flux indicated as $b_x$, $b_y$ and $b_z$. One useful antenna cluster contemplated for use herein is disclosed by U.S. Pat. No. 6,005,532 which is commonly owned with the present application and is incorporated herein by reference. Antenna cluster 26 is electrically connected to a receiver section 32. A tilt sensor arrangement 34 may be provided for measuring gravitational angles from which the components of flux in a level coordinate system may be determined.

Device 20 can further include a graphics display 36, a telemetry arrangement 38 having an antenna 40 and a processing section 42 interconnected appropriately with the various components. The telemetry arrangement can transmit a telemetry signal 44 for reception at the drill rig. The processing section can include a digital signal processor (DSP) or any suitable processor that is configured to execute various procedures that are needed during operation. It should be appreciated that graphics display 36 can be a touch screen in order to facilitate operator selection of various buttons that are defined on the screen and/or scrolling can be facilitated between various buttons that are defined on the screen to provide for operator selection. Such a touch screen can be used alone or in combination with an input device 48 such as, for example, a keypad. The latter can be used without the need for a touch screen. Moreover, many variations of the input device may be employed and can use scroll wheels and other suitable well-known forms of selection device. The processing section can include components such as, for example, one or more processors, memory of any appropriate type and analog to digital converters. As is well known in the art, the latter should be capable of detecting a frequency that is at least twice the frequency of the highest frequency of interest. Other components may be added as desired such as, for example, a magnetometer 50 to aid in position determination relative to the drill direction and ultrasonic transducers for measuring the height of the device above the surface of the ground.

Still referring to FIG. 1, system 10 further includes drill rig 80 having a carriage 82 received for movement along the length of an opposing pair of rails 83. An inground tool 90 is attached at an opposing end of a drill string 92. By way of non-limiting example, a boring tool is shown as the inground tool and is used as a framework for the present descriptions, however, it is to be understood that any suitable inground device may be used such as, for example, a reaming tool for use during a pullback operation or a mapping tool. Generally, drill string 92 is made up of a plurality of removably attachable drill pipe sections such that the drill rig can force the drill string into the ground using movement in the direction of an arrow 94 and retract the drill string responsive to an opposite movement. Each drill pipe section or rod can include a box fitting at one end and a pin fitting at an opposing end in a well-known manner. The drill pipe sections can define a through passage for purposes of carrying a drilling mud or fluid that is emitted from the boring tool under pressure to assist in cutting through the ground as well as cooling the drill head. Generally, the drilling mud also serves to suspend and carry out cuttings to the surface along the exterior length of the drill string. Steering can be accomplished in a well-known manner by orienting an asymmetric face 96 of the boring tool for deflection in a desired direction in the ground responsive to forward, push movement which can be referred to as a "push mode." Rotation or spinning of the drill string by the drill rig will generally result in forward or straight advance of the boring tool which can be referred to as a "spin" or "advance" mode.

The drilling operation is controlled by an operator (not shown) at a control console 100 (best seen in the enlarged inset view) which itself includes a telemetry transceiver 102 connected with a telemetry antenna 104, a display screen 106, an input device such as a keyboard 110, a processing arrangement 112 which can include suitable interfaces and memory as well as one or more processors. A plurality of control levers 114, for example, control movement of carriage 82. Telemetry transceiver 102 can transmit a telemetry signal 116 to facilitate bidirectional communication with portable device 20. In an embodiment, screen 106 can be a touch screen such that keyboard 110 may be optional.

Device 20 is configured for receiving an electromagnetic locating signal 120 that is transmitted from the boring tool or other inground tool. The locating signal can be a dipole signal. In this instance, the portable device can correspond, for example, to the portable device described in any of U.S. Pat. Nos. 6,496,008, 6,737,867, 6,727,704, 8,729,901, 9,739,140 and 10,378,338 each of which is incorporated herein by reference. In view of these patents, it will be appreciated that the portable device can be operated in either a walkover locating mode, as illustrated by FIG. 1, or in a homing mode having the portable device placed on the ground, as illustrated by the U.S. Pat. No. 6,727,704 patent.

While the present disclosure illustrates a dipole locating field transmitted from the boring tool and rotated about the axis of symmetry of the field, the present disclosure is not intended as being limiting in that regard.

Locating signal 120 can be modulated with information generated in the boring tool including, but not limited to position orientation parameters based on pitch and roll orientation sensor readings, temperature values, pressure values, battery status, tension readings in the context of a pullback operation, and the like. Device 20 receives signal 120 using antenna array 26 and processes the received signal to recover the data. It is noted that, as an alternative to modulating the locating signal, the subject information can be carried up the drill string to the drill rig using electrical conduction such as a wire-in-pipe arrangement. In another embodiment, bi-directional data transmission can be accomplished by using the drill string itself as an electrical conductor. An advanced embodiment of such a system is described in commonly owned U.S. Pat. No. 9,274,243 filed on Jan. 2, 2013, which is incorporated herein by reference in its entirety. In either case, all information can be made available to console 100 at the drill rig.

Figure 2:
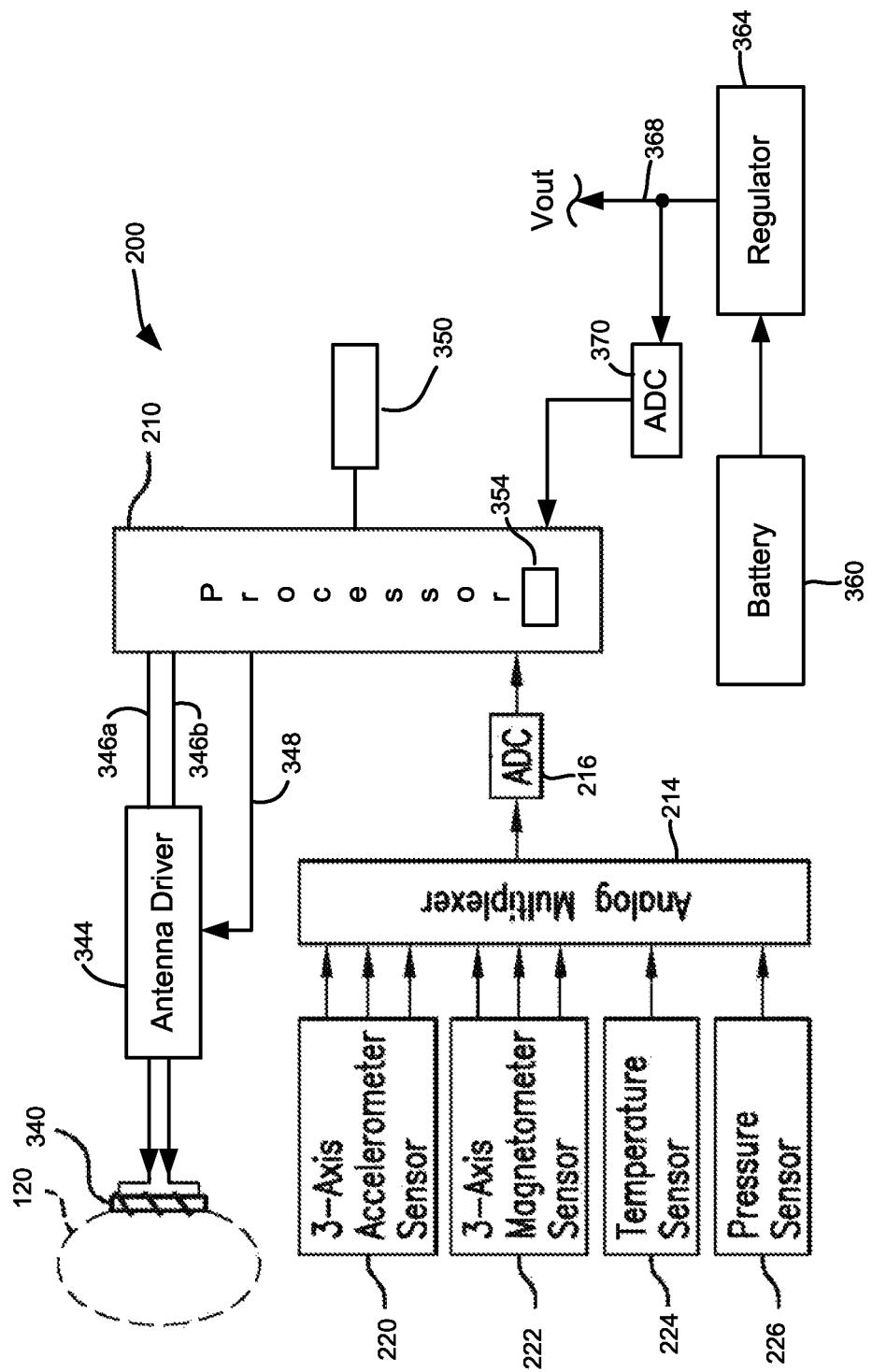
FIG. 2 is a block diagram that illustrates an embodiment of an transmitter (i.e., sonde) for use in an inground device such as, for example, a boring tool in accordance with the present disclosure.

FIG. 2 is a block diagram which illustrates an embodiment of a transmitter (or sonde, which terms may be used interchangeably), generally indicated by the reference number 200, which can be supported or carried by boring tool 90. In either case, the transmitter is capable of transmitting locating signal 120. The transmitter can include a processor 210 of any suitable type. A sensor section 214 can be electrically connected to processor 210 via an analog to digital converter (ADC) 216. Any suitable combination of sensors can be provided for a given application and can be selected, for example, from an accelerometer 220, a magnetometer 222, a temperature sensor 224 and a pressure sensor 226 which can sense the pressure of drilling fluid prior to being emitted from the drill string and/or within the annular region surrounding the downhole portion of the drill string. A dipole antenna 340 can emit aforedescribed signal 120 (FIG. 1) via an antenna driver 344 that is driven by processor 210 on lines 346a and 346b. The processor can disable or turn off the antenna driver using a control line 348. During normal operation, processor 210 uses an external clock/oscillator 350 to run at normal speed. During a processor low power mode, processor 210 uses an internal clock/oscillator 354 to run at far lower speed to reduce the amount of power that is consumed by the processor itself. It is noted that the clock speed in Normal mode can approach three orders of magnitude greater than the clock speed in low power mode. Nevertheless, the processor can wake up periodically in the low power mode.

Still referring to FIG. 2, a battery 360 provides electrical power to a voltage regulator 364. A voltage output, $V_{out}$, 368 can include one or more output voltage values as needed by the various components of the transmitter. The output voltage of battery 360 can be monitored, for example, by processor 210 using an analog to digital converter 370. The transmitter can be modified in any suitable manner in view of the teachings that have been brought to light herein.

Continuing to refer to FIG. 2, given that transmitter 200 is battery powered, it can be important to conserve battery power while underground drilling is ongoing during stretches where locating is not possible or desired and therefore the locating signal is not needed. In this regard, a depleted battery during an inground operation is a substantial inconvenience since accessing the transmitter would require the operator to trip the drill string and transmitter out the borehole, perhaps many hundreds of feet, replace the battery and then trip the transmitter back into the borehole. As will be seen, transmitter 200 can be configured to conserve power while underground drilling is ongoing in ways that are submitted by Applicants to be heretofore unknown.

Figure 3:
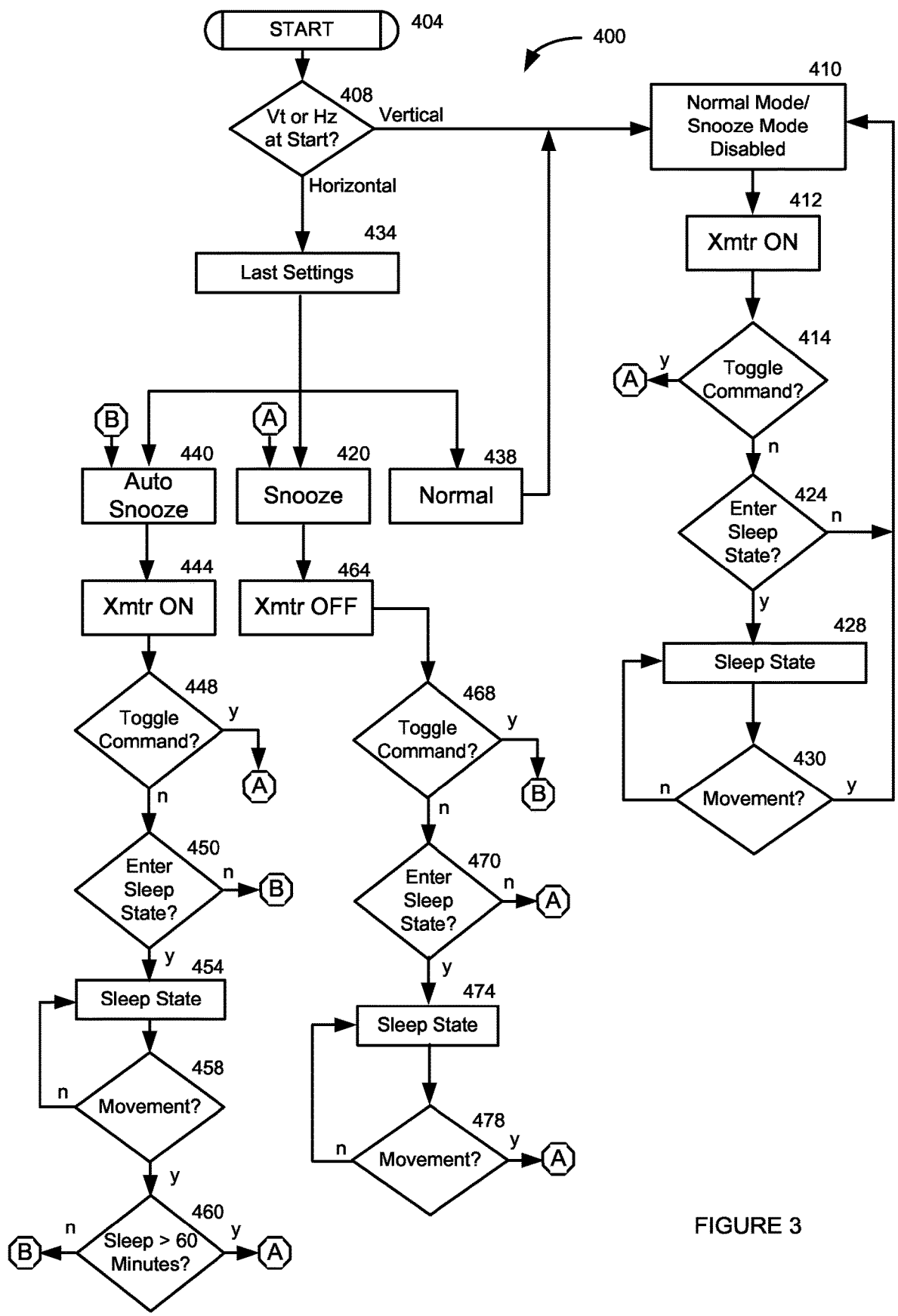
FIG. 3 is a flow diagram illustrating an embodiment of the operation of a transmitter in accordance with the present disclosure in order to conserve battery power.

Attention is now directed to FIG. 3 which illustrates an embodiment of a method for the operation of transmitter 200, generally indicated by the reference number 400. The method begins at start 404 and proceeds to 408 which establishes the operational mode of the transmitter during startup. In one implementation, the pitch orientation of the transmitter at the time of battery insertion (i.e., power-up) can be used to establish the operational mode. In the present example, if the sonde is oriented vertically or within some range from vertical (e.g., +/−20 degrees) at step 408, the sonde can then enter what can be referred to as a Normal operational mode at 410. While the transmitter is actively being used during the Normal operation mode, all of the electronics can be powered up at 412 with antenna driver 344 for locating signal 120 on. The processor will run using external clock 350 in FIG. 2. It is noted that, in another embodiment, start-up of the transmitter can also be managed through infrared (IR) or Bluetooth™ pairing with locator 20 to establish its operational status. For example, in an embodiment, the transmitter can be placed into a Snooze mode, yet to be described, via Bluetooth at start-up rather than entering a Normal mode at start-up. Any suitable methods for selecting or establishing the operational mode of the transmitter during startup can be used, either currently available or yet to be developed.

During Normal mode operation, step 414 monitors for a mode toggle command. In the present, non-limiting embodiment, the mode toggle command is a predetermined roll orientation sequence. One suitable sequence has been found to be four full rotations of the boring tool each of which rotations is separated from the next rotation by a pause for 10 to 20 seconds. The final rotation is followed by an additional pause, for example, from 4 to 60 seconds. It is noted that other rotation sequences applicable in the Normal Mode to other functionality can be utilized without modification. The mode toggle command detected at 414 can be issued, for example, by an operator of the drill rig at any time that the transmitter is awake. If the transmitter is asleep in a sleep state, it is necessary to first wake up the transmitter, for example, in a manner described below. If the mode toggle command is detected at 414, operation is routed to 420 (via a diagrammatic node "A") and the transmitter enters a Snooze mode which will be described at an appropriate point below and may be referred to interchangeably as the Snooze mode. It is noted that when the mode toggle command is received, the transmitter leaves the Normal mode and there is no path to return to the Normal mode from another mode, although this is not a requirement.

If step 414 does not receive the mode toggle command, operation routes to 424 which determines whether the sonde is actively in use, that is, whether the sonde is being moved. If so, Normal mode continues at 410. In an embodiment, the roll orientation based on the output of accelerometer 220 can be monitored to confirm whether the roll orientation has changed to establish movement. If the roll orientation has changed, for example, by an amount that is greater than some threshold value, operation returns to 410 and normal operation continues. In an embodiment, the threshold value can be 5 degrees. On the other hand, if processor 210 detects no movement for a suitable period of time at 424 such as, for example, 15 minutes, the sonde is not active and a sleep state, which can be referred to as a sleep mode, is entered at 428. During the sleep state, all non-essential electronics are powered down including, for example, antenna driver 344, the various sensors, multiplexer 214, ADCs 216 and 370, and external clock 350. Processor 210 enters its low power mode using internal clock 354. Periodically during sleep mode, the processor wakes up at 430 to facilitate reading accelerometer 220 to establish the roll orientation and whether movement is taking place. It is noted that the processor can wake up at any suitable interval even down to a few seconds. If the roll orientation has not changed or has changed by less than some specified amount such as, for example, 60 degrees, operation returns to sleep state at 428 and the processor again disables any electronics that were needed to read the roll orientation and returns to low power mode. If at 430, a determination is made that the sonde is actively being moved, the processor wakes up the sonde and operation returns to Normal mode at 410. Accordingly, steps 410 through 430 comprise the Normal mode which includes the sleep state or mode wherein the transmitter can go to sleep when there is no activity and awaken once activity resumes.

Returning to the discussion of step 408 and in the present non-limiting embodiment, if the transmitter is started in a horizontal orientation or at least within some suitable range from horizontal orientation such as, for example, +/−65 degrees, the transmitter can start up with the same settings that were in use when the transmitter was last powered down, although this is not required. Suitable non-volatile memory in the transmitter can be utilized for this purpose. It is noted that this is a safety feature that avoids concerns with inadvertent rebooting of the transmitter, for example, responsive to battery chatter (i.e., the connection with a battery contact is momentarily lost) when drilling with significant mechanical vibration. At 434, the last settings are retrieved and set up. As shown, there are three possible options for the last settings. One option is Normal mode operation 438 which simply routes to 410, such that Normal mode proceeds in a manner that is consistent with the descriptions above. Another start-up option is AutoSnooze, at 440. As will be shown below, AutoSnooze mode provides a difference from Normal mode in that if the transmitter is asleep for an amount of time that exceeds a threshold, then when the transmitter is awoken from the sleep state, the transmitter automatically enters Snooze mode. The AutoSnooze mode is characterized by the transmitter actively transmitting locating signal 120 unless the mode toggle command is received. Accordingly, at 444, the transmitter is on with antenna driver 344 (FIG. 2) actively driving the antenna and receiving information from the processor. At 448, the processor monitors for the mode toggle command. If the mode toggle command is detected, operation routes to Snooze mode, yet to be described. If the mode toggle command is not detected, operation routes to 450 which operates in a manner that is consistent with previously described step 424. That is, if processor 210 detects no movement for a suitable period of time, the sonde is not active and a sleep state is entered at 454. The transmitter will remain in the sleep state until such time that movement is detected at 458 in a manner that is consistent with step 428. During the sleep state, the processor periodically wakes up to determine whether the transmitter has moved and records the amount of time that the transmitter has been asleep. Once step 458 detects movement, operation proceeds to 460 which determines how long the transmitter has been asleep beyond the original 15 minutes that caused the transmitter to enter the sleep state at 450 in the first instance. In the present embodiment, the sleep interval is compared to a threshold value of 60 minutes, although any suitable interval duration can be used. If step 460 determines that the transmitter was asleep for less than 60 minutes, operation remains in AutoSnooze mode by routing to 440. If the transmitter was asleep for 60 minutes or longer, operation routes to Snooze mode 420. It should be appreciated that switching to the Snooze mode, for time intervals greater than 60 minutes, serves as a safety feature for circumstances that can inadvertently drain the battery of the transmitter by transmitting the locating signal when it is either not receivable or not needed. In this regard, a transmitter might somehow inadvertently switch states when waking up or an operator can simply lose track of the current operational state. It is noted that the Normal mode simply remains in the Normal mode when waking up from sleep mode irrespective of the amount of time spent in the sleep mode.

Still describing FIG. 3 and, in particular, a Snooze mode, the latter is entered at 420. At 464, the transmitter ceases transmission of locating signal 120, for example, shutting down antenna driver 344. Other elements essential to transmitting the locating signal can also be shut down. For example, internal timer peripherals of the processor that are used to generate drive waveforms for the locating signal can be closed. At 468, the processor monitors for the mode toggle command. If the mode toggle command is detected, operation routes to AutoSnooze at 440. In other words, operation switches or toggles from Snooze mode to AutoSnooze mode such that transmission of the locating signal resumes. On the other hand, if 468 does not detect the mode toggle command, operation routes to 470, which establishes whether the transmitter should enter the sleep state in a manner that is consistent with the description of step 450 above. For example, the transmitter can go to sleep if there is no activity for 15 minutes. If the transmitter remains awake, operation is routed to 420 and the transmitter remains in Snooze mode such that the locating signal is not transmitted. If the transmitter is placed into sleep, the sleep state starts at 474. At 478, the processor monitors for movement of the transmitter in a manner that is consistent with the descriptions of steps 430 and 458. That is, the transmitter can be awakened if a rotation greater than 60 degrees is detected. If no movement is detected, the transmitter remains asleep. If movement is detected, operation is routed to 420 with Snooze mode continuing such that locating signal 120 is not transmitted.

Having described the various operation modes, it should be appreciated that when operating in the AutoSnooze mode, the mode toggle command (detected at 448) can be issued, for example, by an operator of the drill rig at any time that the locating signal is either not receivable or not needed to activate the Snooze mode which causes processor 210 to shut down at least antenna driver 344 and can shut down any other components that are associated with generation of the locating signal. For example, the locating signal may not be needed as a result of transmitting data to the surface on a wireline. The operator can return to the AutoSnooze mode from the Snooze mode at any time that there is a need to receive the locating signal by issuing another mode toggle command, for example, to periodically check the location of the transmitter as an endpoint of the drill run is approached.

Figure 4:
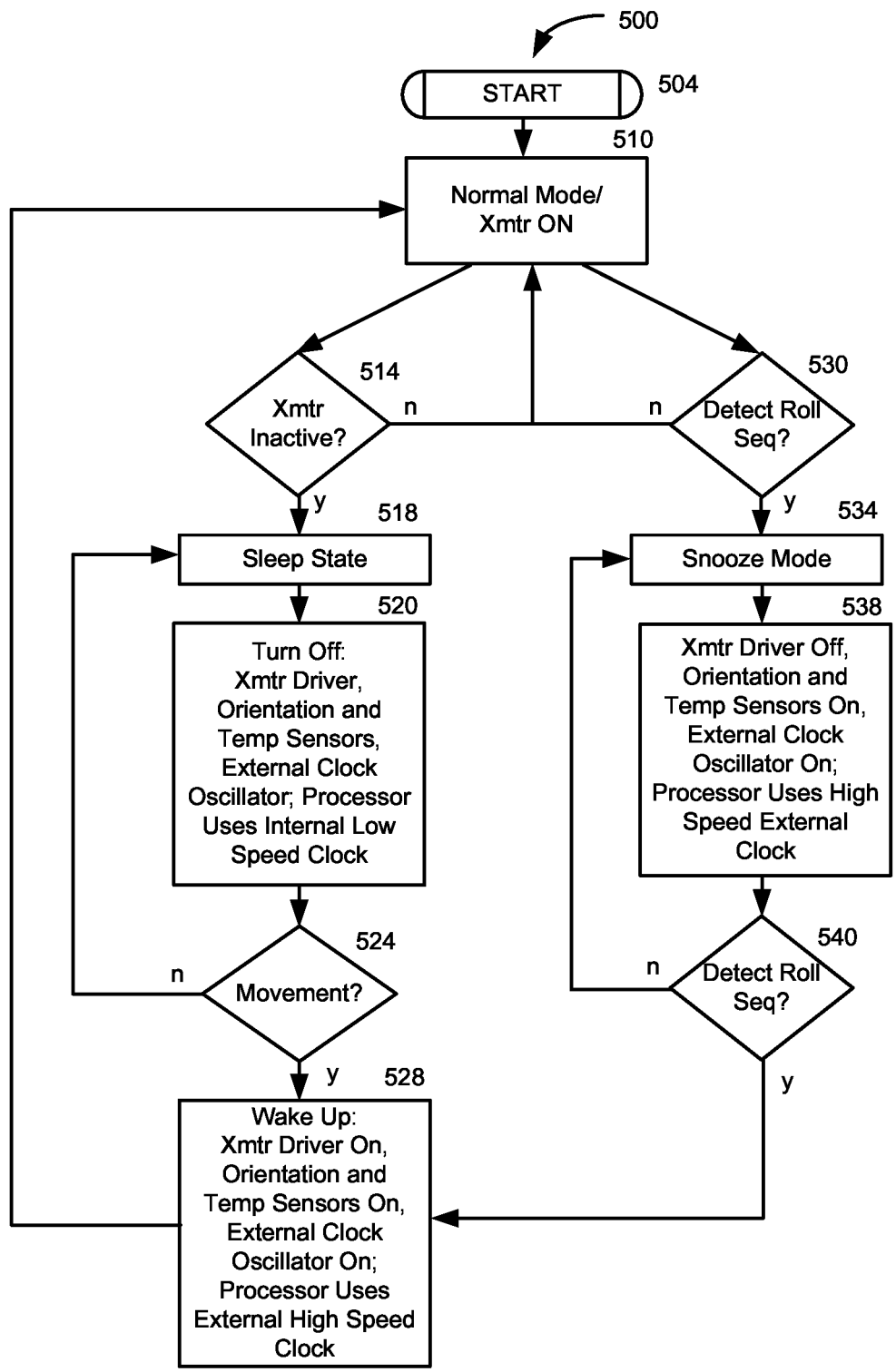
FIGS. 4 and 5 are flow diagrams illustrating additional embodiments of the operation of a transmitter in accordance with the present disclosure in order to conserve battery power.

Attention is now directed to FIG. 4, which illustrates another embodiment of a method for the operation of sonde 200 is generally indicated by the reference number 500. The method begins at 504 and proceeds to 510 with the Normal operational mode being entered such that the transmitter and all components are fully operational in a manner that is consistent with the descriptions above. Step 514 monitors for an inactive state of the transmitter. If the transmitter remains active, operation remains in Normal mode. If the transmitter is inactive (i.e., not moving), for example, for at least 15 minutes, the sleep mode can be entered in a manner that is consistent with the description of step 424 of FIG. 3. At 520, and by way of non-limiting example, the processor turns off the antenna driver, orientation and temperature sensors, an external clock oscillator and switches to an internal low speed clock, as discussed above. Once in the sleep mode, at step 524, processor 210 monitors for movement of the transmitter, for example, in a manner that is consistent with the description of step 430 of FIG. 3. If no movement is detected, operation remains in sleep mode 518. If movement is detected, operation moves to 528 which wakes up the entire transmitter. For example, the antenna driver is turned on, orientation and temperature sensors are turned on along with the external clock and the processor then runs from the external clock.

Turning again to Normal mode 510, step 530 monitors for a suitable roll orientation sequence at 530, one of which is described above. If the roll orientation sequence is not detected, operation remains in Normal mode. If the roll orientation sequence is detected, operation moves to 534 such that the transmitter enters the Snooze mode. For example, at 538, the processor turns off the antenna driver, however, the orientation and temperature sensors and other electronics that may be involved with detecting the roll orientation sequence remain on. The processor also can continue to operate at high speed on the external clock. At 540, the roll orientation sequence is again monitored for. If the roll orientation sequence is not detected, operation remains in the Snooze mode at 534. On the other hand, if the roll orientation sequence is detected, operation moves to 528 which wakes up the transmitter and then enters the Normal mode. It is noted that, in transiting from Snooze mode to Normal mode, most of the electronics of the transmitter will already be on with the processor operating at normal speed. What is necessary is to turn on locating signal 120 by activating antenna driver 344 and any other peripheral devices that are necessary to transmit the locating signal.

Figure 5:
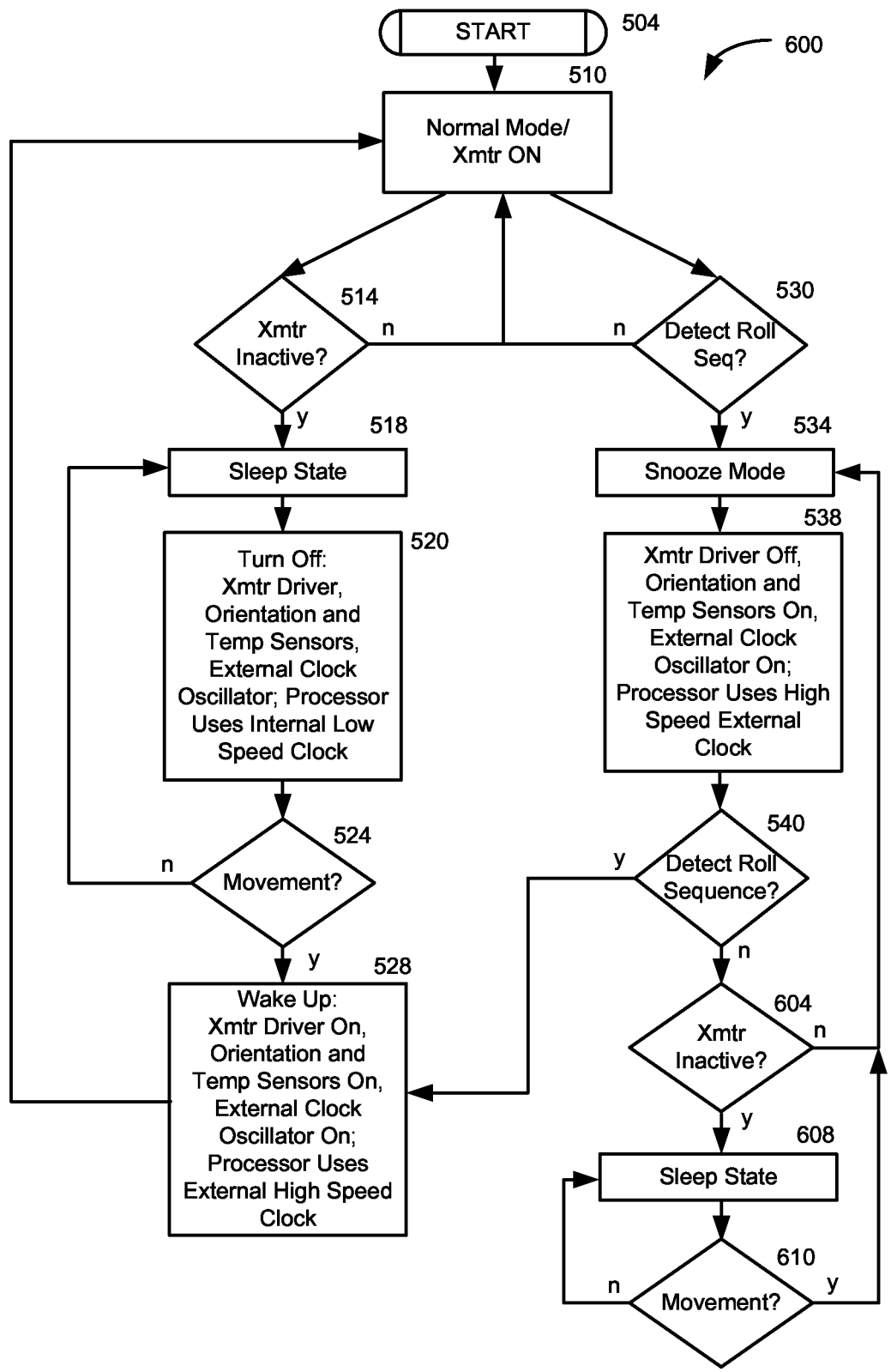

Turning to FIG. 5, still another embodiment of a method for the operation of sonde 200 is generally indicated by the reference number 600. It is noted that most of the process shown is shared with the method of FIG. 4. Hence, descriptions of like steps will not be repeated for purposes of brevity. What is different with respect to method 500 resides in the insertion of additional steps between aforedescribed steps 540 and 528. These additional steps relate to the sleep state. After step 540, step 604 monitors for whether the transmitter is inactive which can be consistent with the description of step 514 in FIG. 4. If the transmitter is active, operation remains in the Snooze mode at 534. If the transmitter is not active, operation enters the sleep mode at 608 which is consistent with the descriptions of steps 518 and 520, above. At 610, monitoring for movement is performed in a manner that is consistent with step 524. If movement is not detected, the transmitter remains in sleep mode at 608. If movement is detected, the transmitter returns to Snooze mode at 534.

Based on the foregoing, it should be recognized that power savings are provided for situations beyond what is available from only the sleep state—namely, while underground drilling is ongoing. While the power savings may be less than what can be accomplished during sleep state, the power savings derived from Snooze mode can still be significant given that transmission of locating signal 120 comprises a significant load on the transmitter battery. The present disclosure provides an operator with heretofore enhanced and unseen capability based on the particular circumstances of a drill run such that the locating signal can be shut down when it is not needed or not receivable when drilling under a river or busy motorway.

In one embodiment, the present disclosure brings to light a transmitter for use in conjunction with a horizontal directional drilling system that includes a drill string that extends from a drill rig to an inground tool which supports the transmitter such that extension and retraction of the drill string moves the inground tool through the ground during an inground operation. The transmitter includes an antenna and one or more sensors for generating sensor data. An antenna driver is configured for selectively driving the antenna to emit a locating signal for aboveground reception. The locating signal is transmitted during each of the Normal mode and the AutoSnooze mode but not in the Snooze mode. Detection of a mode toggle command in each one of the AutoSnooze mode or the Snooze mode causes the processor to place the transmitter into the other one of the Snooze mode or the AutoSnooze mode. The processor is further configured for placing the transmitter into a low power sleep state during each one of the Normal mode, the AutoSnooze mode and the Snooze mode based on inactivity of the transmitter such that the locating signal is not transmitted during the sleep state and for waking up the transmitter responsive to movement thereof.

In another embodiment, the present disclosure brings to light a transmitter for use in conjunction with a horizontal directional drilling system that includes a drill string that extends from a drill rig to an inground tool which supports the transmitter such that extension and retraction of the drill string moves the inground tool through the ground during an inground operation. The transmitter includes an antenna and one or more sensors for generating sensor data. An antenna driver is configured for selectively driving the antenna to emit a locating signal for aboveground reception. The locating signal is transmitted during a Normal mode during which the transmitter can enter a sleep state responsive to inactivity. During the sleep state, the processor periodically awakens to monitor for activity. Detection of a mode toggle command during the Normal mode causes the processor to place the transmitter into a Snooze mode which at least temporarily ends transmission of the locating signal.

Accordingly, the present disclosure provides for a locating system whereby the transmitter can be substantially deactivated, including no transmission of signal, while underground drilling is in process, and subsequently activated later during the underground drilling when the transmitter is needed, thereby conserving transmitter battery power for when the transmitter is needed. Applicant recognizes that there are many use scenarios which can benefit from such a system beyond those benefits that are attendant to a prior art transmitter that simply saves battery power by going to sleep when there is no underground drilling activity. One example resides in a system having a wireline such that the drill run can begin by using the wireline to the drill rig, but near the end of the drill run, the locating signal can be turned on. Another example involves obstacles such as bodies of water, highways, buildings and even hills. When transiting under a body of water, highway or building, there can be no practical way to receive the locating signal. As far as drilling under a hill, a drill run might include cover above an intended path such that the transmitter is too deep for reliable reception of the locating signal either at the end of the drill run or at intermediate points. Thus, the locating signal can be turned off when the cover is too deep above the drill path. Once the depth is acceptable, the locating signal can be activated and walkover locating can begin or resume. Applicant is unaware of any prior art system that provides such benefits.

The foregoing description of the invention has been presented for purposes of illustration and description. It is not intended to be exhaustive or to limit the invention to the precise form or forms disclosed, and other modifications and variations may be possible in light of the above teachings wherein those of skill in the art will recognize certain modifications, permutations, additions and sub-combinations thereof.

What is claimed is:

1. A transmitter for use in conjunction with a horizontal directional drilling system that includes a drill string that extends from a drill rig to an inground tool which supports the transmitter such that extension and retraction of the drill string moves the inground tool through the ground during an inground operation, said transmitter comprising:
   an antenna;
   a sensor section at least including an orientation sensor for generating sensor data;
   an antenna driver configured for selectively driving the antenna to emit a locating signal for aboveground reception such that the locating signal carries the sensor data; and
   a processor for controlling the antenna driver to transmit the locating signal during a normal mode and to enter a sleep state that disables at least the sensor section and the antenna driver such that the locating signal is not transmitted responsive to detecting that the transmitter is inactive and said processor is further configured to enter the sleep state from a snooze mode such that the snooze mode disables the antenna driver so that the locating signal is not transmitted, without disabling the sensor section, and the snooze mode requires less power than the normal mode but more power than the sleep state.

2. The transmitter of claim 1 wherein said processor is configured to enter the snooze mode responsive to detecting a toggle command based on the orientation sensor data.

3. The transmitter of claim 2 wherein the toggle command is a predetermined roll orientation sequence detectable by said processor responsive to the orientation sensor.

4. The transmitter of claim 2 wherein the processor is configured to enter an autosnooze mode from the snooze mode responsive to detecting the toggle command during the snooze mode and to enable the antenna driver such that the locating signal is transmitted during the autosnooze mode.

5. The transmitter of claim 4 wherein the processor is configured to return to the snooze mode responsive to detecting the toggle command during the autosnooze mode such that switching between the autosnooze mode and the snooze mode responsive to the toggle command selectively turns the locating signal on and off, respectively.

6. The transmitter of claim 4 wherein the processor is configured such that the normal mode cannot be reentered from the snooze mode and from the autosnooze mode.

7. The transmitter of claim 1 wherein the processor is configured to enter the sleep state from the snooze mode based on detecting that the transmitter is inactive during the snooze mode.

8. The transmitter of claim 1 wherein the processor is configured such that the normal mode cannot be reentered from the snooze mode.

9. The transmitter of claim 1 wherein said processor is configured to enter the snooze mode from the normal mode responsive to detecting a toggle command based on the orientation sensor data and to reenter the normal mode from the snooze mode responsive to detecting the toggle command such that switching between the normal mode and the snooze mode responsive to the toggle command selectively turns the locating signal on and off, respectively.

10. The transmitter of claim 9 wherein said processor is configured to enter the sleep state from each of the snooze mode and the normal mode.

11. The transmitter of claim 1 wherein said processor is configured to place the transmitter into the snooze mode at startup responsive to a wireless communication.

* * * * *